Dec. 25, 1951      C. G. MUNTERS      2,579,509
APPARATUS FOR REMOVING MOISTURE
FROM HEAT INSULATING WALLS
Filed May 28, 1949      2 SHEETS—SHEET 1
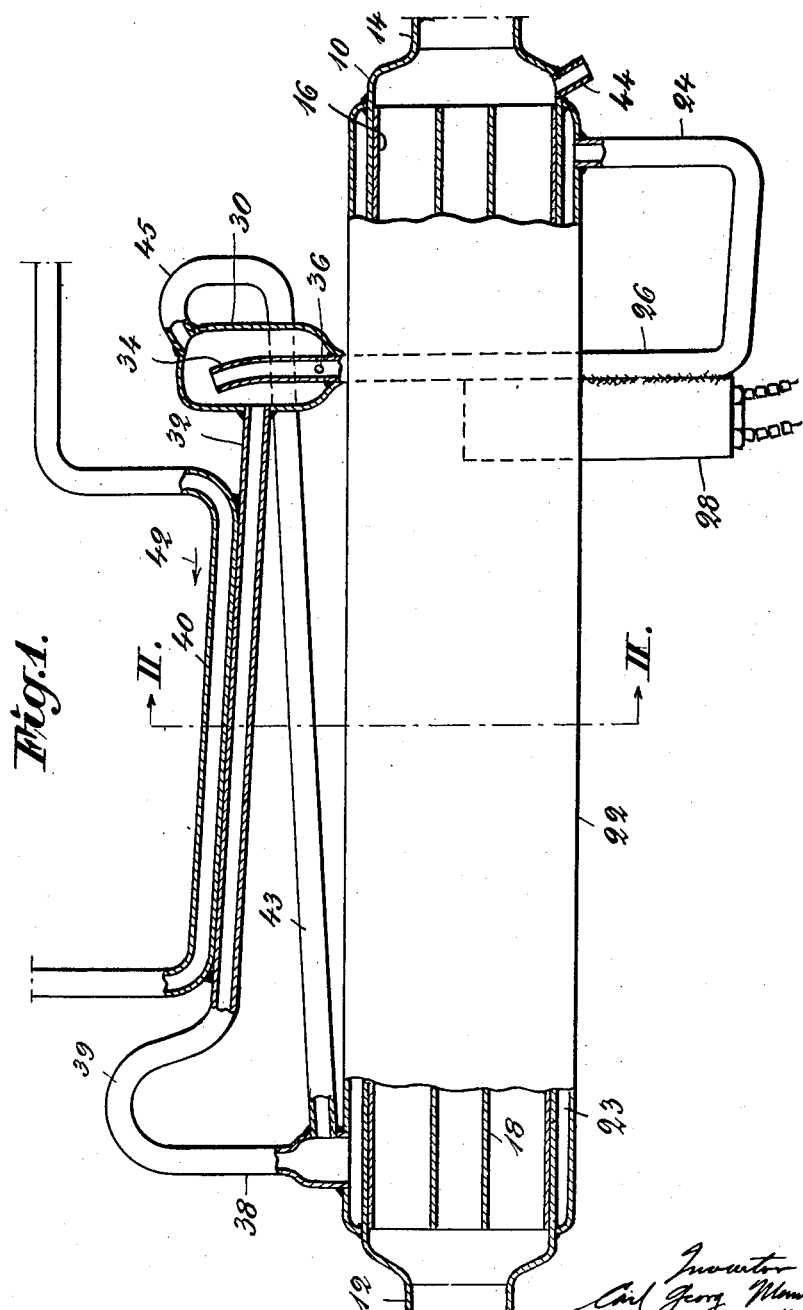

Dec. 25, 1951          C. G. MUNTERS          2,579,509
APPARATUS FOR REMOVING MOISTURE
FROM HEAT INSULATING WALLS
Filed May 28, 1949          2 SHEETS—SHEET 2
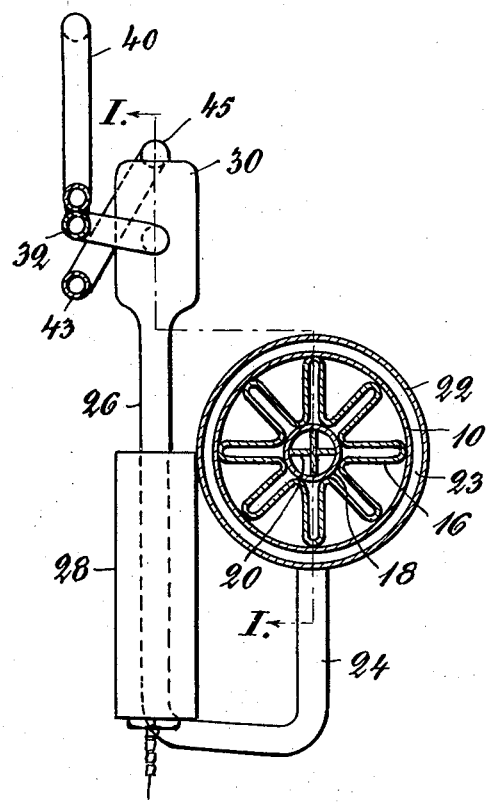

Patented Dec. 25, 1951

2,579,509

UNITED STATES PATENT OFFICE 2,579,509

APPARATUS FOR REMOVING MOISTURE FROM HEAT INSULATING WALLS

Carl Georg Munters, Stocksund, Sweden

Application May 28, 1949, Serial No. 95,948
In Sweden December 15, 1947

15 Claims. (Cl. 62—140)

My invention relates to apparatus for removing moisture from heat insulating walls, for example, of a cold storage chamber or the like by means of the circulation of precooled air through said walls.

In the operation of such devices relatively dry precooled air passing through the walls due to its nonsaturation and to being subjected to a rising temperature within the walls is capable of absorbing moisture present within said walls. The impelling force necessary for such ventilating air currents may be produced either by utilising gravity, in which case two air columns of different temperature and different specific weights are balanced against each other with the resultant component urging the air stream through the wall in the desired direction, or such air flow may be assisted or produced by means of a fan.

A proposal has been made for removing the moisture of the air prior to its entry into the wall passages in a container co-operating with a cooling element and comprising a condenser element and an evaporator element interconnected to form a closed circulation system wherein heat transfer from the air takes place through the evaporation of a liquid medium. In such proposal the air has been conveyed in a definite path, that is, through a conduit into the wall which is preferably provided with circulation passages so that the dried air is brought into contact with the various parts of the insulation with certainty, particularly in the case where precipitation of moisture within the walls is to be expected.

One object of my invention is to provide an improved apparatus adapted at suitable time intervals to be relieved of the moisture which has been deposited in a solid state within a container during the circulation of air therethrough without utilising any movable member, such as valves or the like, within the cooling system.

Further objects and advantages of my invention will be apparent from the following description considered in connection with the accompanying drawings which form part of this specification and of which:

Fig. 1 shows in part-sectional elevation a demoistening apparatus constructed in accordance with the invention, the section being on the line I—I of Fig. 2;

Fig. 2 is a transverse section on the line II—II of Fig. 1.

Referring to Fig. 1, 10 designates an elongated container preferably of circular cross section, having at one end a connecting socket 12 intended to be connected to a conduit communicating with the insulated wall and through which the cooled and consequently dried air is conveyed to the wall. It is found of advantage to connect the inlet socket 14 at the other end of the container 10 to a conduit, which also communicates with the insulated wall, so that the circulation through the passages of the wall and through the drying apparatus takes place in a closed circuit, in the manner above described. The container 10, having its axis disposed horizontally or approximately so, is preferably provided with surface-enlarging and bracing inserts, for example, in the form of a sheet-metal member 16 folded to a starlike configuration, said sheet-metal member extending longitudinally of the container and being welded at its outer extremities to the container and inwardly to a smaller cylindrical tube 18. Further, the tube 18 may have a cross member 20 arranged therein. The passages in the container thus produced are open at both ends.

The container 10 is surrounded by a jacket 22, which preferably encircles the entire circumference of the container so as to form an annular jacket space 23, from the lower portion of which extends a conduit 24, which is first directed downwardly and is then reversely bent to form an upwardly extending conduit limb 26. An electrical heater element 28 is in heat conductive relation with the lower portion of said limb 26, preferably by being welded thereto. The conduit limb 26 opens at its upper end within a receptacle 30, the tube being preferably extended upwardly to a level in said receptacle above the mouth of a condenser conduit 32. The upper part 34 of the member 26 may be bent slightly towards the conduit 32. At the base of the receptacle 30, the member 26 is provided with a number of small apertures 36, the combined passage area of which is considerably less than that of the conduit itself.

Connected to the upper portion of the jacket 22 at the opposite end of the container 10 is a conduit 38 having a reverse bend 39 in the vertical plane and then merging into the condenser conduit 32, which latter slopes slightly from said bend in a downward direction toward the receptacle 30. A conduit 40 is in heat conducting contact with the condenser conduit 32 for the greater portion of the length thereof, the two pipes preferably being welded or soldered to each other. The conduit 40 communicates with a refrigerating machine (not shown) in such manner that the refrigerant thereof is caused to pass through the conduit, for instance in the direction of the arrow 42, and then may flow for example to the cooling member producing the cold necessary to adjust the temperature of the cold-storage room to the desired value. A conduit 43 extends above and along the container 10 at a slightly upward inclination toward the receptacle 30 and opens with its bent end portion 45 into the upper part of said receptacle. The other end of the conduit 43 preferably communicates with the conduit 38. The container 10 is provided with one or more draining conduits 44.

The closed heat transfer system constructed as described above contains a transfer medium, such as ammonia or a medium of the freon-type, under a pressure such that in the normal operation of the plant it is caused to condense at the temperature prevailing in the cooling medium conduit 40, for instance at a temperature of minus 10 to 20 degrees centigrade or below, and is vaporised in the annular space 23. During normal operation, the vapours forming in the annular space 23, which is filled with liquid for the major portion thereof, will escape, preferably for the major portion thereof through the conduit 38 to the condenser conduit 32, where they are brought to a liquid state, the heat of condensation being absorbed by the cooling medium passing through the pipe 40. The condensate flows into the receptacle 30 and through the apertures 36 in the conduit limb 26 into the latter, and thence through the conduit 24 back to the annular space 23.

During this period the temperature of the air passing through the interior of the container 10 is lowered to, for example, a few degrees above the temperature of the condenser conduit 32, the moisture in the air thus being reduced to a correspondingly low percentage. This moisture is deposited on the walls of the plurality of passages in the container 10, so that defrosting of the container becomes necessary after the lapse of some time. To this end, the heater 28 is switched on so as to supply heat to the liquid standing in the conduit limb 26. This liquid is thus caused to boil, and due to the vapour generation thereby created the liquid column is raised above the upper edge of the conduit 26 forming a pump tube into the receptacle 30.

The liquid column standing in the pump tube is thus filled with a quantity of vapour bubbles, which reduce the specific weight of the column and carry along the liquid, so that the latter is raised to a level higher than the liquid level in the remainder of the closed system. The raised liquid fills the condenser conduit 32 to a level corresponding to the upper end of the receptacle 30, the bend 39 preventing the liquid from escaping from the conduit 32 to the tube 38.

On the other hand, the upwardly moving liquid and vapour bubble stream in the pump tube 26 overcomes the weight of the liquid column located above the apertures 36 in the receptacle 30. The warm liquid fills the receptacle 30, flows over into the conduit 43 and down into the annular space 23, so that ice formed in the container 10 is caused to melt. It will be understood that in this defrosting process the pressure is caused to rise in the closed system so that the boiling point of the liquid will be higher than before. The water resulting from the melting of the ice escapes through the conduit 44.

When defrosting has been completed, the heat supply to the system through the heater 28 is interrupted and the condenser conduit 32 now empties through the apertures 36, whereupon the process above described with evaporation of the medium in the annular space 23 so as to cool the circulating air and condensation in the condenser 32 is repeated. The heater 28 may be switched on manually or automatically by means of a time clock or the like. Switching-off of the heater may be effected by means of a thermostat or bimetal element influenced by the temperature of the container 10, such thermostat or bimetal element being responsive to a determined increase in temperature.

During the defrosting process the liquid present in the condenser conduit 32 prevents circulation through this conduit, so that the cooling effect of the refrigerant passing through the conduit 40 is consequently for all practical purposes negligible. This removal of the condenser conduit 32 from the circuit takes place without the use of valves or the like, the device thus being very certain in operation. It will be understood that should the conduit 40 also deliver cold to the cooling members of the cold storage room, such delivery need not be interrupted or deleteriously affected during the defrosting period.

The invention is obviously not limited to the embodiment shown by way of example. For example, in order to facilitate the draining of the water during the defrosting process, the walls of the insert 16 in the container 10 may be perforated. Further, the expression "heat insulating walls" used throughout this specification and claims may also comprise or refer to a floor and/or a ceiling or roof of a chamber. Thus the device according to the invention may be utilised where demoistening of roofs alone, for example, is to be undertaken.

What I claim is:

1. Apparatus for cooling and removing moisture from air comprising means providing a closed evaporating-condensing heat transfer system containing a body of heat transfer fluid circulating in normal operation between the condenser and the evaporator of the system with which the air to be cooled is in heat exchange relation, means for cooling said condenser to effect normal circulation of the fluid in the system, a heating element for supplying heat to said system, means included in the system and operative in response to heat added by said element for creating a liquid seal of said fluid blocking the normal circulation of said fluid through the system, and means included in the system for conducting liquid of said fluid heated by said element to said evaporator to defrost the same.

2. Apparatus as defined in claim 1 in which the evaporator is located below the condenser and connected with the condenser by a rising conduit to which heat is supplied by said heating element, said conduit providing a vapor-liquid lift for lifting liquid of said fluid from the evaporator to provide said liquid seal.

3. Apparatus as defined in claim 2 in which said seal is maintained between liquid lifted to a higher level than the condenser at one end thereof and a conduit connecting the other end of the condenser with the evaporator and having a portion located at a higher level than the condenser.

4. In a closed evaporating-condensing heat transfer system containing a body of heat transfer fluid, an evaporator, a condenser located above the evaporator, a first conduit for conducting vapor of said fluid from the evaporator to the condenser inlet, and means including a second conduit communicating with the condenser outlet and with the evaporator and a heating element in heat exchange relation with said second conduit for creating a liquid seal of said fluid blocking normal circulation of fluid in the system when said heating element is activated.

5. A system as defined in claim 4, in which said evaporator comprises an elongated conduit for flow of air to be cooled and means providing a jacket space around said conduit for said fluid.

6. A system as set forth in claim 5 including means providing extended heat exchange surface in said conduit.

7. A system as defined in claim 4 including a third conduit communicating with the condenser outlet and with the evaporator, said third conduit having a portion located above the level of the condenser.

8. In a closed evaporating-condensing heat transfer system containing a body of heat transfer fluid, an evaporator, a condenser located above the evaporator, a first conduit for conducting vapor of said fluid from the condenser inlet, a second conduit communicating with the outlet of the condenser for conducting condensate to the evaporator, said second conduit having a rising portion, and a heating element for supplying heat to said rising portion to create a vapor-liquid lift for lifting liquid of said fluid to the outlet of the condenser to provide a liquid seal blocking normal circulation of fluid in the system.

9. In a closed evaporating condensing heat transfer system containing a body of heat transfer fluid, an evaporator, a condenser located above the evaporator, a first conduit for conducting vapor of said fluid from the evaporator to the condenser inlet, a receptacle communicating with the condenser outlet, a second conduit having a rising portion connecting the evaporator with said receptacle and extending above the base of the latter, said second conduit being apertured within said receptacle at a level adjacent to the base thereof, and means for heating said second conduit.

10. Apparatus as defined in claim 9 in which the aperture area in said second conduit is less than the cross sectional area of the conduit.

11. Apparatus as defined in claim 9 in which said second conduit terminates in said receptacle at a level above that of the condenser outlet.

12. Apparatus as defined in claim 9 including a third conduit connecting said receptacle with said evaporator, said third conduit having a portion located above the level of said condenser.

13. Apparatus as defined in claim 12 in which said third conduit opens into said receptacle at a level above that of the condenser outlet.

14. Apparatus as defined in claim 9 in which said first conduit includes a portion located at a level above said condenser.

15. Apparatus as defined in claim 9 in which the condenser inclines downwardly from inlet to outlet.

CARL GEORG MUNTERS.

REFERENCES CITED

The following references are of record in the file of this patent:

UNITED STATES PATENTS

| Number | Name | Date |
|---|---|---|
| 1,934,133 | Lauderback | Nov. 7, 1933 |
| 2,151,713 | Nieman | Mar. 28, 1939 |
| 2,334,513 | Shaw | Nov. 16, 1943 |
| 2,338,452 | Munters | Jan. 4, 1944 |